March 28, 1944.　　S. G. WASHBURN　　2,345,542
HARVESTING MACHINE
Filed May 22, 1941　　2 Sheets-Sheet 2
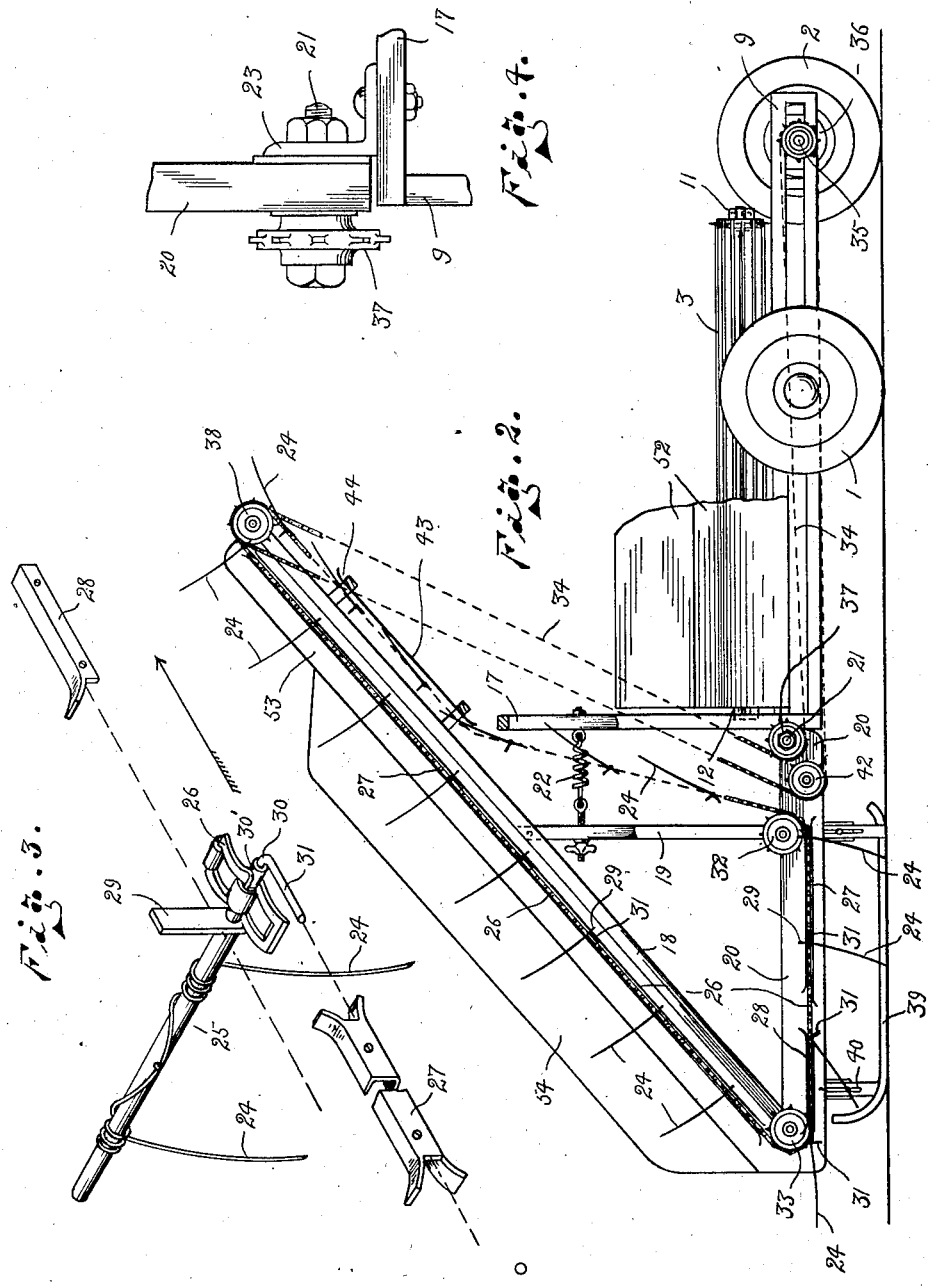
INVENTOR.
Selden G. Washburn.
BY Geo. Stevens.
atty Patented Mar. 28, 1944

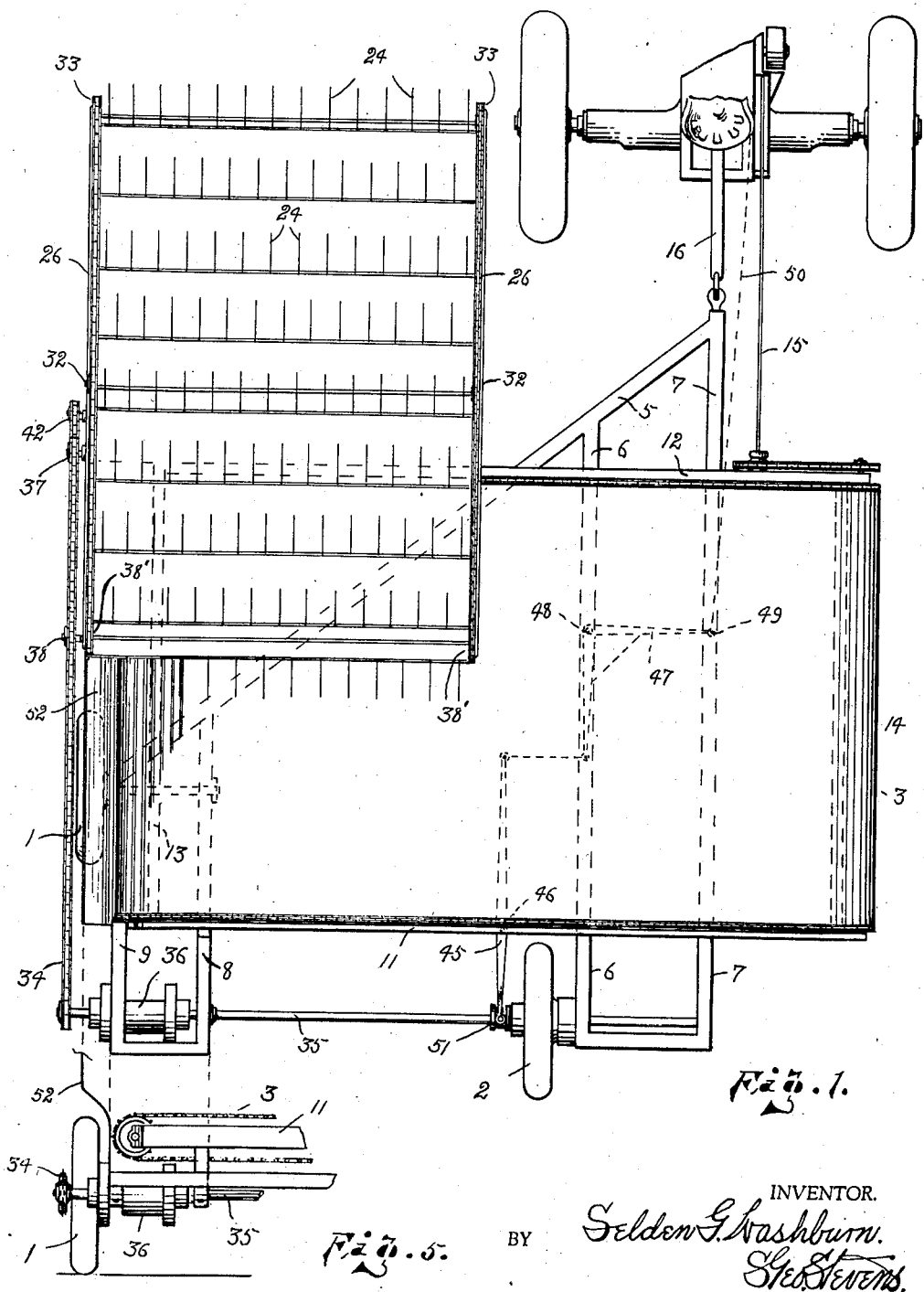

2,345,542

UNITED STATES PATENT OFFICE 2,345,542

HARVESTING MACHINE

Selden G. Washburn, Goodwin, S. Dak.

Application May 22, 1941, Serial No. 394,587

2 Claims. (Cl. 56—354)

This invention relates to harvesting machines and has special reference to that type usually referred to as hay loaders, though the instant invention contemplates such a machine well adapted for use in the handling of sheaves of grain, hay cocks, or the like.

The principal object is to provide a more practical and efficient device of this character.

Another object is to provide simple means whereby the gathering tines of the device are positively manipulated so as to accomplish the best results possible.

Another object is that of providing a means whereby such a machine not only functions admirably in gathering large bundles of grain or the like, but also functions well as a gleaning device.

A further object is to provide a more practical one man harvesting machine and by means of which crops may be gathered and conveyed directly to the ultimate place of disposal.

Still other objects and advantages of the invention will appear in the following description thereof.

Referring now to the accompanying drawings, forming part of this application, and wherein like reference characters indicate like parts:

Figure 1 is a top plan view of one of the assembled machines as it would appear being drawn by a farm tractor.

Figure 2 is a somewhat diagrammatic side elevation of the machine, partly in section for a better comprehension.

Figure 3 is an enlarged broken perspective view of certain parts of the device illustrating their relation to each other.

Figure 4 is an enlarged plan view of one of the pivotal connections of the feeding frame of the machine.

Figure 5 is a rear elevation of the transmission corner of the device shown as projected from Figure 1.

In my improved harvesting device, a suitable chassis is mounted upon wheels, for example, such as illustrated at 1 and 2 and carrying thereupon a horizontally disposed endless rack illustrated at 3, and in front of which rack at one side of the center thereof is carried an inclined raking and feeding conveyor such as illustrated at 26, this latter being designed to engage the material to be gathered and elevate same backwardly onto the transversely disposed rack 3, and the device is provided with suitable means for operative engagement with a farm tractor.

The attachment of my improved device is deemed novel in that the frame-work of such is of general triangular form, the principal supporting members of which are illustrated at 5, 6, 7, 8, and 9, connected in any desired manner beneath the rack 3. Above this main frame structure of the chassis is supported the rectangularly shaped frame illustrated by the members 11, 12, 13 and 14, this latter structure supporting the transversely disposed endless rack 3 in any desired manner.

From the tractor operating such a device I propose to control the operation of this endless rack 3 by any form of suitable power take-off connection illustrated at 15, this being common practice in tractor drawn devices, while the draft connection intermediate of the operating tractor and the harvester is illustrated at 16, in this instance such point being the forwardly extending apex of the triangularly shaped supporting frame, previously described.

An upright frame structure more clearly illustrated in Figure 2 of the drawings, is shown at 17, it being rigidly supported in any desired manner upon the frame previously described supporting the rack 3. This frame structure 17 occurs upon one side of the center of said supporting frame and at the forward edge thereof, this being for the partial support of the pivotally mounted feeding conveyor frame comprising the members 18, 19 and 20, forming each side portion thereof, and, at the lower rearmost corners of which latter frame structure, a pivotal connection of same to the supporting frame 17 is accomplished as by the connection illustrated in Fig. 4 of the drawings which includes a bolt indicated at 21 passed through the free end of each member 20 and through a suitable angle clip 23 fixed to the supporting frame of the rack 3. Such pivotal support is provided at each lowermost corner of the feeder frame, so that the forward end of the feeder frame may be raised and lowered as desired for best results, and to this end I have illustrated a manually adjustable bolt and contractile spring connection as illustrated at 22 intermediate of the upper end of the frame structure 17 and the member 19 of the feeder frame. This also provides a more or less desired resilient action of such connection and cooperating parts.

While the specific arrangement of the various parts of these frame structures referred to are not essential in the instant invention, the relation of same as here shown partly in Figure 2 of the drawings is deemed novel in that the feeding belt carrying the raking and picking up tines 24 thereupon is caused to return for a predetermined distance from the upper end of the feeder supporting frame parallel therewith so as to pass over and outwardly of the upper terminus of the frame 17, thus avoiding any interference by the returning tines of the feeder belt with the load being placed upon the transverse rack 3, and for which purpose a sheet metal guiding apron 43 is suitably suspended from the members 18 of the feeder frame, and, obviously when the tines 24, on their downward travel, pass over the upper edge 44 of said apron, they will automatically free themselves of any of the gathered material which might otherwise adhere to them.

Furthermore, to permit of control of the action of the tines of the feeder belt I have illustrated in Fig. 3 the tine carrying shafts 25 as being pivotally mounted within the links of the belts 26 and subject during their travel to engagement in certain predetermined places, with angularly shaped stationary guiding members upon either side thereof, such for example as illustrated at 27 and 28, and these guiding members may be in channel or angle form, as desired, in certain locations, and are supported where desired upon the members 18 and 20 upon either side of the feeder to accomplish the proper rotation of the tine carrying shafts 25. For such engagement and operation of the tine carrying shafts I have shown fixed to preferably each end of each shaft 25 a radially disposed dog-like member 29, just inwardly of each belt 26. This construction also contemplates the reduction in size of the shaft 25 as at 30 where each passes through the links of the drive belt, and outwardly of which the reduced portion 30 is bent at right angles forming a second fixed portion of each shaft extending radially therefrom as at 31, but at right angles to the member 29, so that as, for example, when the belt carrying the shafts 25 approaches a predetermined location, and it is desired that the tines of the feeding belt change their position and become extended towards the travel of the belt, the member 29 may be caused to engage such a guiding member as illustrated at 28, which will properly rotate the shaft 25 for such position, and which is very essential for example at the forward lower end of the feeder to cause the proper pitching action of the tines when engaging the object to be raised. The pivotal connection of the shafts 25 to the links of the chain 26 is accomplished by the provision of short pieces of pipe indicated at 30' fixed to one link of the chain and in which the reduced end 30 of each shaft 25 is rotatably mounted. Also for example, when it is desired that the tines travel at right angles to the carrying belts, the members 31 of the shafts may be caused to travel within a channel-like guiding member or members, such as suggested at 27.

From the above it will be seen that for proper functioning of the device a guide such as illustrated at 27 may be employed where the belt 26 is operated in a substantially horizontal position in front of the chassis portion of the harvester (see Fig. 2), and, intermediate of the sprocket wheels 32 and 33, when it is desired that the tines, extending in that portion of the belt, maintain rigidly their scraping or raking position. Just rearwardly of the sprocket 33 a guide of the type shown at 28 may be employed to engage the member 29 and cause the tine carrying shaft to rotate upwardly and about the sprocket 32 carrying its respective load with it.

The driving of the feeding belt or conveyor is preferably accomplished by means of a sprocket chain belt indicated at 34 leading from the power shaft 35 of the transmission housing 36 to and about the idling sprocket or pulley 37 on the outermost one of the connections 21, upon which the feeder frame is pivotally mounted, thence upwardly to and about the driving sprocket 38 at the upper corner of the feeding belt; there, of course, being a suitable shaft extending across the upper end of said conveyor for support of both sprockets 38' for said belt, thence downwardly to and about the sprocket or pulley 42 carried upon the member 20 of the feeder frame and which sprocket may be used as a tightener for said chain.

It will be noted that the transmission housing 36 is mounted rearwardly of the transverse rack 3, and the supporting wheel 1 of the harvester is forwardly of the other supporting wheel 2 and just outwardly of the innermost end of the rack 3, and, at this end of the rack 3, is provided the upstanding shield 52 to prevent harvested material from falling off of the end of said rack and still permit of the wheel 1 being within the adjacent side limits of the harvester. The rearmost supporting wheel 2 is rearwardly of said rack 3 and preferably in direct line with the transmission housing 36 and supporting the rearmost end of the members 6 and 7 of the main frame, thus forming a well balanced support therefore, and one which to some extent will counterbalance the weight of the forwardly overhanging feeder frame and attachments. This wheel 2 performs a double function in that the power from the axle thereof is transmitted to the transmission within the housing 36, and for which purpose said power must be readily controlled as for example by the clutch controlling lever 45 pivoted as at 46 and operated by the bell crank lever suggested at 47, pivoted at 48 on the member 6 of the main frame of the harvester, the innermost arm of which lever 47 is connected as at 49 to a rod or like connection indicated at 50 leading to the power tractor where such lever may be controlled in any desired manner. This arrangement it is seen will provide most convenient means for the operator to first load half of the rack 3 by advancement of the harvester and then by throwing out the friction clutch 51 may operate the receiving rack 3 and thus transfer the loaded part thereof to a position directly behind the tractor when the other half of the rack 3 may be loaded prior to, for example, conveyance to a stack, silo filling machine, barn, or the like.

It is also to be noted that the feeder frame is provided with a pair of preferably somewhat yieldable shoes indicated at 39, fixed to either side of the feeder carrying frame for auxiliary support of same when the harvester is being used, and these being preferably of inverted T-iron are readily equipped with upright slotted standards 40 which are adjustably bolted to suitable depending leg-like members from the frame portions 20 of the feeder.

One object of these shoes is to provide simple means for uniform support for the feeder frame of the machine to insure proper relation of especially the raking tines to the ground as it will be noted that the spacing of the tines of the feeder belt is such as to insure there always being two sets of them in the act of raking, as clearly seen in Fig. 2 of the drawings, and the preferred speed of the belt in relation to that of the travel of the machine is somewhat augmented so that these gleaning tines will travel approximately 10% faster than the movement of the machine, to insure a thorough job of raking.

While the assembly shown in Fig. 4 is that of the power transmitting side of the feeder frame, and the sprocket 37 is necessarily shown, the opposite pivotal connection of the frame is identical with such showing except that no sprocket wheel is assembled therewith.

In actual practice it has been determined that when such a harvester is being used during a very windy day it is desirable to protect the upwardly traveling grain or hay on the feeder belt and to this end there is provided the shield 53, the major portion of which is provided with a lighter form of shield 54.

Having thus described my invention, what I claim and desire to secure by Letters Patent, is:

1. In a raking, pitching and conveying unit of the class described for attachment to a propelling vehicle, a major normally flat conveyor belt carrying chassis portion, a minor substantially triangularly shaped frame structure, means adjacent the lowermost rear corners of said structure for pivotal attachment to said major chassis portion, an endless conveyor belt carried by said structure having installed therein spaced tine carrying shafts, ground engaging means carried by the lowermost horizontal portion of said structure, and belt guiding means above said ground engaging means for retaining a plurality of said shafts in horizontally spaced relation whereby to augment the raking properties of said tines.

2. In a harvesting unit of the type described, for gathering field crops and designed to be trailed by a power supplying vehicle, a rectangularly shaped main belt carrying chassis portion having means adjacent and forwardly of one corner thereof for connection with said power supplying vehicle, a substantially triangularly shaped inclined belt carrying frame structure pivotally carried forwardly of and adjacent the other corner of said main chassis portion and selectively adjustable means intermediate of said triangular frame structure and said main chassis portion and above said pivotal connection thereof whereby to regulate the height of the forward end of said triangular frame structure.

SELDEN G. WASHBURN.